Feb. 4, 1947. C. G. TRIMBACH ET AL 2,415,153
MOUNT AND SPENT AMMUNITION RETRIEVER FOR FLEXIBLY MOUNTED GUNS
Filed May 1, 1934 3 Sheets-Sheet 1
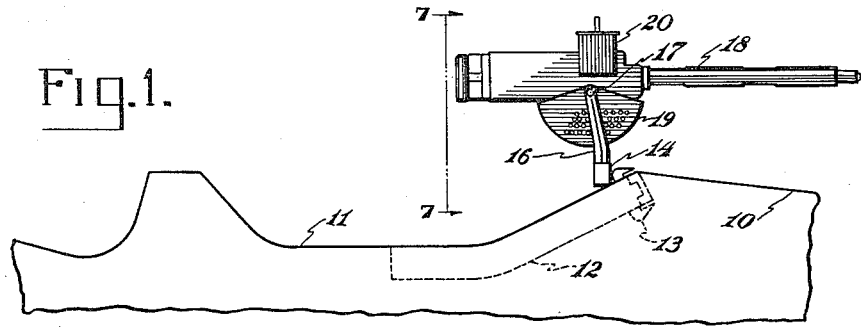
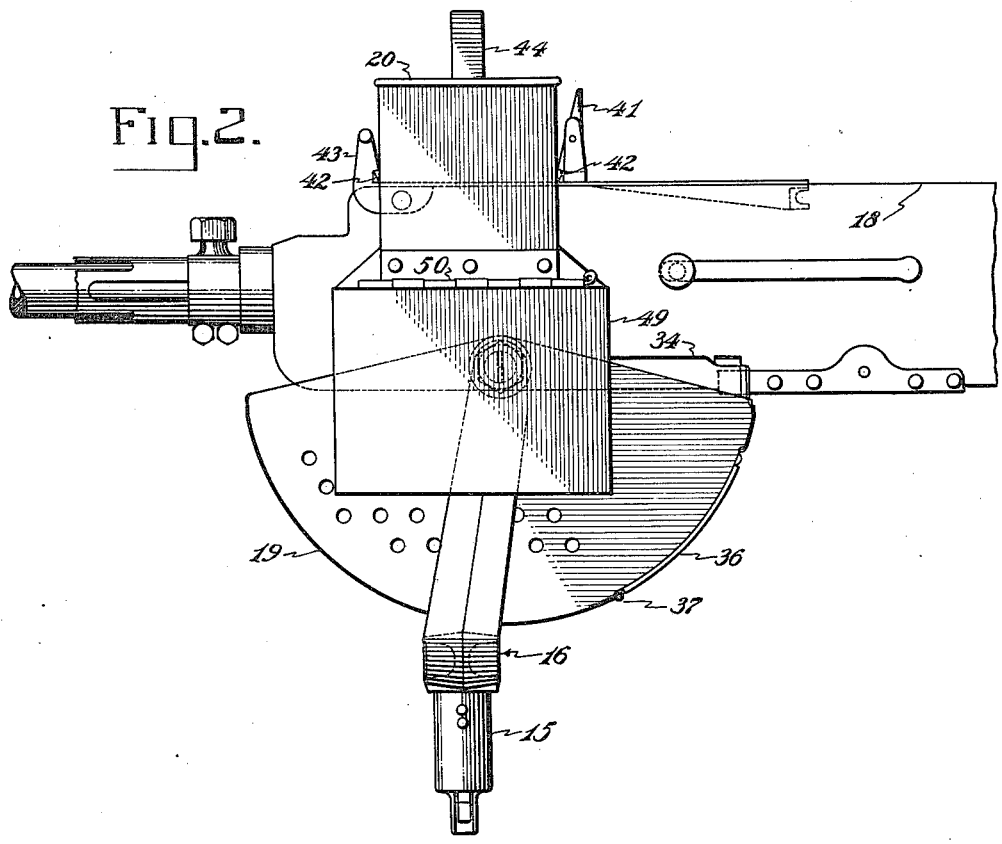
INVENTOR.
CLEM G. TRIMBACH.
GUY A. LUBURG.
BY CAMILLE A. LEMONIER.
ATTORNEYS.

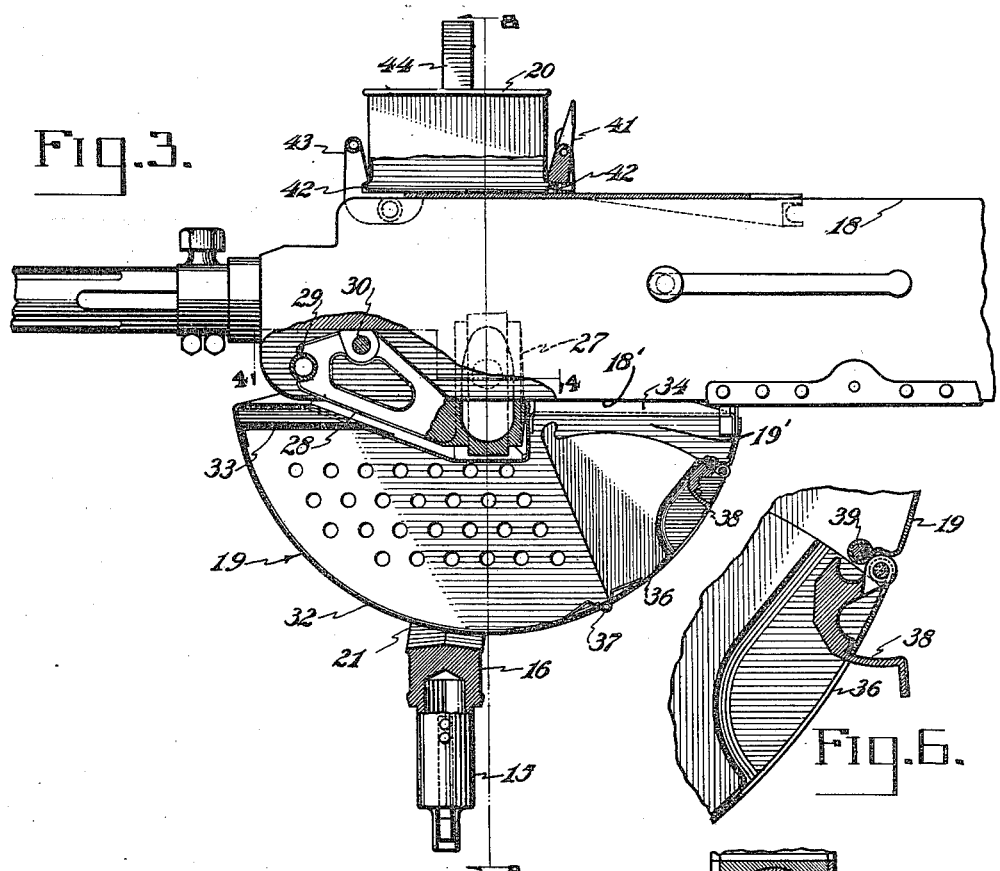
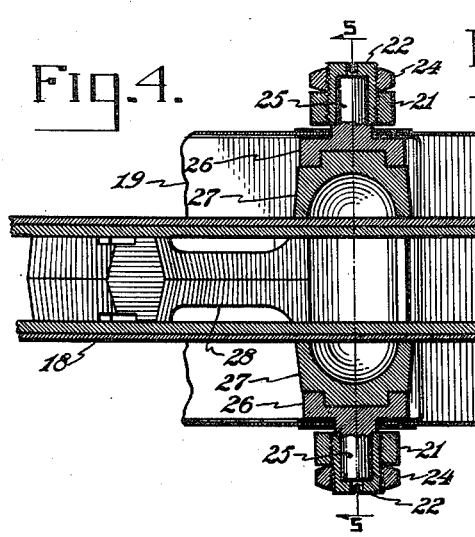
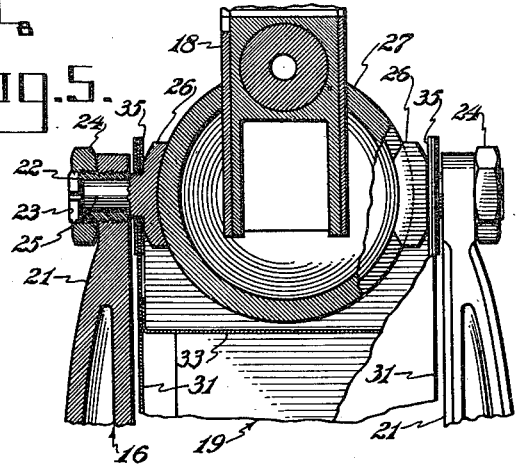

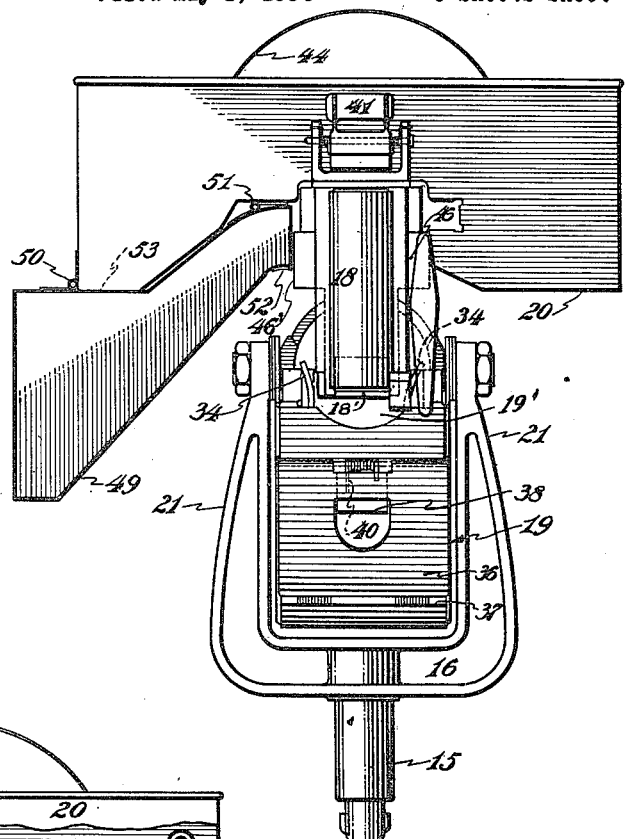
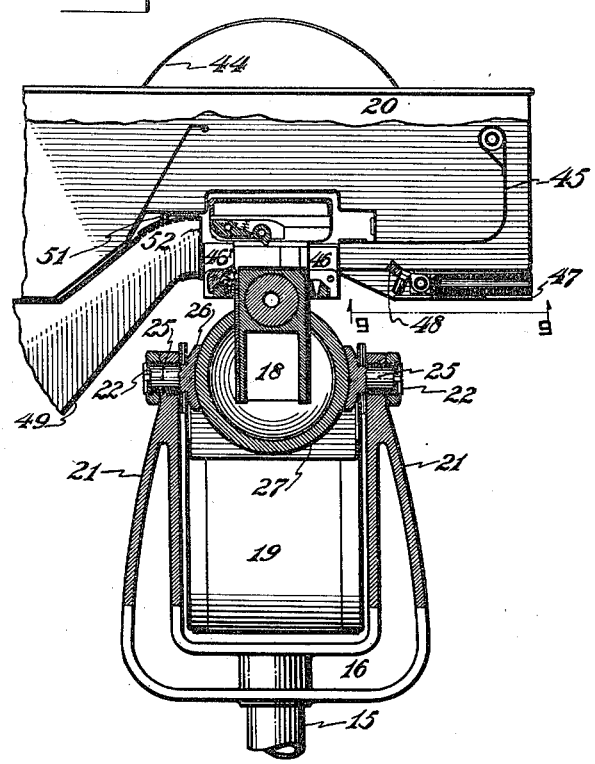
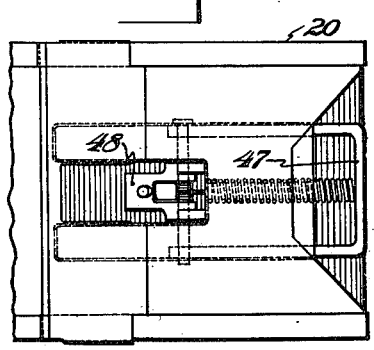
INVENTOR.
CLEM G. TRIMBACH.
GUY A. LUBURG.
BY CAMILLE A. LEMONIER.
ATTORNEYS.

Patented Feb. 4, 1947

2,415,153

UNITED STATES PATENT OFFICE 2,415,153

MOUNT AND SPENT AMMUNITION RETRIEVER FOR FLEXIBLY MOUNTED GUNS

Clem G. Trimbach, Kenmore, Guy A. Luburg, Snyder, and Camille R. Lemonier, Kenmore, N. Y., assignors to Curtiss Aeroplane and Motor Company, Incorporated, Garden City, N. Y., a corporation of New York Application May 1, 1934, Serial No. 723,294

13 Claims. (Cl. 89—37.5)

This invention relates to aircraft armament, and is particularly concerned with improvements in flexible machine gun mounts.

The embodiment of the invention herein described constitutes in part, improvements in the form of flexible gun mount shown and described in a co-pending application, Serial No. 683,958, filed August 7, 1933. The flexible gun mount is adapted to be used in conjunction with a track and carriage organization as shown and described in a patent to Trimbach, No. 1,968,182, issued July 31, 1934.

Generally speaking, the invention comprises a gun carrying yoke swivelly mounted on a carriage capable of being traversed along a track. The yoke carries at the upper end of its bifurcated arms a pair of opposed blocks, which are trunnioned in the yoke arms. These blocks engage a grooved ring which embraces the machine gun near its center of gravity. The gun, by the sliding engagement of the blocks with the ring, is capable of being laterally tilted with respect to the yoke. Likewise, the gun may be elevated and depressed by virtue of the trunnion mounting of the blocks in the upper ends of the yoke arms. In addition, we provide a novel form of retrieving case into which the cartridge shells of expended ammunition may be ejected. This case lies between the arms of the yoke and is pivotally supported on the above mentioned block trunnions. The case, then, moves with the gun when the latter is elevated or depressed, but, since it is held on the trunnion, it does not tilt when the gun is tilted. The opening in the upper part of the case is so organized, however, that ammunition may be ejected thereinto regardless of the tilt position of the gun. The gun is provided with what is known as a "saddle type" ammunition container for feeding belted ammunition into the gun. To a lower portion of this ammunition container, a retrieving case is attached for receiving the separable links from the belted ammunition after the ammunition has been expended.

The loaded ammunition container and the last mentioned retrieving case are detachable from the gun together, after which the retrieving case may be detached from the ammunition container.

In practice, flexible guns such as mounted in patrol flying boats, particularly where the gun is located ahead of the propeller, must be provided with means for retrieving all elements of expended ammunition—otherwise, the elements might fly rearwardly into the propeller, causing considerable damage. Therefore, the provisions of this invention are particularly applicable to such patrol boats, but may be used beneficially in other applications. The cartridge shells in aircraft machine gun ammunititon are usually not reclaimed, since the change in their shape due to firing makes them unsuitable for re-use. It is essential that only the most perfect ammunition be used in aircraft to avoid misfire, gun jamming and the like. Therefore, the retrieving case for empty cartridge shells is organized to hold a somewhat greater number of shells than might be belted in a loaded ammunition container. However, provision is made for quickly emptying this retrieving case into a suitable receptacle or into the cockpit of the aircraft. The belt links, which are ejected into a case attached to the ammunition container, may be used over again, and thus the arrangement of having the belt link case attached to the ammunition container lends itself to economy and expeditious servicing. Loaded ammunition containers, with empty belt link cases attached, are installed in the aircraft ready for use. When the gun is being used, a loaded container with the empty case is put in place on the gun, and the links for that container are ejected into the case so that, when the container is empty the whole unit is removed along with the case full of belt links. This unit may then be returned to the armory for re-loading, where the armorer may reclaim the links from the retrieving case.

Objects of the invention are to provide a gun mount of relatively universal character with which retrieving cases for elements of expended ammunition are adapted to be used; to provide retrieving cases for elements of expended ammunition suitable for use with a flexible machine gun mount; to provide a retrieving case for the separable links of belted machine gun ammunition; to provide a retrieving case for the empty cartridge shells of machine gun ammunition; to provide suitable quickly operated means for emptying the last mentioned case; and to provide a machine gun mount embodying the above features which may be readily assembled and disassembled for service.

Reference may be made to the specification and drawings for a fuller explanation of the details of this invention, in which:

Fig. 1 is a side elevation of a portion of an aircraft having a gun mounted in accordance with this invention;

Fig. 2 is a side elevation of the gun mount and adapter with the ammunition container and retrieving cases;

Fig. 3 is a view similar to Fig. 2, partly in section, showing details of construction;

Fig. 4 is a section on the line 4—4 of Fig. 3;

Fig. 5 is an enlarged portion of Fig. 8, with the ammunition container removed;

Fig. 6 is an enlarged section of a portion of Fig. 3;

Fig. 7 is a rear elevation of the gun and mount on the line 7—7 of Fig. 1;

Fig. 8 is a section on the line 8—8 of Fig. 3; and

Fig. 9 is a bottom view on the line 9—9 of a portion of Fig. 8.

In Fig. 1, 10 represents an aircraft fuselage having a cockpit opening 11 around a portion of the edge of which a track 12 is mounted. A carriage 13 is organized to traverse along said track and carries a socket 14 within which a lower end, designated in other figures as 15, of a bifurcated yoke 16, may engage. The upper ends of the yoke arms carry trunnions 17 in which a machine gun 18 is mounted in a manner hereinafter to be described. Between the upstanding arms of the yoke 16 a retrieving case 19 for empty cartridge shells is mounted, and on the gun, a loaded ammunition container 20 is clipped.

Referring now to the other figures, the arms 21 of the yoke 16 are threaded at their upper ends to receive externally threaded bushings 22, each of these bushings being provided with a screw slot 23 at its outer end, and a jam nut 24 serving to lock the bushing in its adjusted position. The bores of the bushings 22 in the respective arms 21 are aligned, and a trunnion block having a journal 25 engages within the bore of each bushing. This trunnion block at its inner end is formed as a segment 26 having a grooved face. The opposed segments 26 engage a ring 27 having its face shaped in complement to the faces of the segments 26. This ring is slotted at its upper end to receive the breech of the machine gun 18, and an integral extension 28 extends forwardly from said ring to anchor the gun thereto by means of suitable mounting bolts 29 and 30 engaging the breech of the gun and the extension 28. Thereby, the ring 27 is firmly held as a part of the gun. The segments 26 may be caused to bear with greater or less pressure upon the ring 27 by virtue of the adjusting bushings 22. By this construction it is apparent that the gun may be tilted or depressed in elevation by virtue of the journals 25, and also, the gun may be tilted laterally by virtue of the sliding contact of the ring 27 upon the segments 26.

This mounting arrangement permits a considerable freedom of movement of the gun for aiming purposes. The lateral tilting of the gun in the yoke 16 is particularly useful, for instance, when the carriage 13 of Fig. 1 is on a slanting portion of the track 12. The gun may be tilted to lie in a vertical plane whereby more accurate aiming is accomplished. The gun also may be tilted to any degree necessary to properly accommodate the sights to the eyes of the gunner when he is aiming the gun in directions in which the normal rectilinear relation of the gun mount would be inconvenient.

The case 19 for retrieving empty cartridge shells comprises a pair of spaced substantially semi-circular side plates 31 joined by a substantially semi-circular bottom plate 32 and by a top plate 33. The side plates are perforated to allow instant inspection of the quantity of shells in the case. The top plate is formed, as shown in Fig. 3, to accommodate the ring 27 and the extension 28. The rearward top portion of the case 19 is open as at 19', but below the cartridge ejection opening 18' of the gun 18, the case 19 is provided with laterally disposed baffles 34, shown in Figure 7, bordering the opening 19' whereby cartridge cases ejected from the gun immediately above the opening 19' may pass to the case 19 regardless of the lateral tilt of the gun with respect thereto. The case 19 is hung on the journals 25, suitable reinforcements 35 being provided on the side plates 31 to form an adequate bearing for the case upon these journals. The case, then, is free to turn in elevation with the gun and with the journals, with respect to the yoke 16, but the case is held from lateral tilting due to the fact that it is carried on the journals 25, and due to the fact that the gun laterally tilts with respect to said journals. The case 19 is provided with a chute type door 36, spring-hinged as at 37, so that the door is normally urged closed. A latch 38 is pivoted at the edge of the door opposite the hinge 37 to engage with a bead 39 across the case 19 This latch is normally urged to lock the door 36 in a closed position by means of a spring 40, shown in Fig. 7. The other door details are best shown in Figs. 3 and 6. By elevating the gun and pulling the latch 38 outwardly, the door 36 is opened and empty shells within the case may be emptied into a suitable external container. Thereupon, the latch 38 may be released, after which the door closes and locks itself automatically.

The saddle type ammunition container 20 is releasably clipped to the top of the machine gun by means of a latch 41, this latch engaging against a shoulder 42 on the container. The forward edge of the container is also provided with a shoulder 42 which engages in a notched bracket 43 fixed to the gun. The container 20, then, may easily be removed by pressing the latch 41, and may be replaced by simply snapping it into place after the shoulder 42 engages the bracket 43 A handle 44 is provided at the top of the container for transportation thereof.

Referring to Fig. 8, the container 20 is provided with an internal baffle 45 for guiding belted ammunition into a feed chute 46 at one side of the gun. A loading handle 47 mounted in the container may be reciprocated to force the initial cartridges of the ammunition belt into the feed chute This handle works on a pawl 48 which engages the cartridges in the belt to force them into the gun. Since the saddle type container 20 passes over the gun and overhangs the opposite side thereof, a case 49 is attached to the container 20 by means of hinges 50 and 51, the hinges in each case having removable pins whereby the case 49 may be readily detached from the container 20. Said case is provided with a receiving chute 52 registering with a gun opening 46', shown in Fig. 8, from which the separated belt links are ejected after expenditure of the loaded ammunition. Thus, the belt links pass from the gun, through the chute 52 into the case 49. Said case is of such capacity that it will accommodate all the links used in the loaded belt which may be accommodated in the container 20. The loaded container 20 will have an empty case 49 attached thereto in the armory, and upon expenditure of the ammunition, the empty container 20 will be returned to the armory with the case 49 full of belt links. In the armory, then, the pins of the hinges 50 and 51 may be removed and the case 49 emptied through an opening 53 formed in the upper face thereof. This opening 53 is covered by a portion of the container 20 when the case 49 is assembled to the container 20.

In operation of the gun, it will be apparent from the foregoing that the ammunition container 20 with the belt link retrieving case 49, at all times moves with the gun when the latter is being aimed. The case 49 is so formed as to not limit the angle of tilt of the gun with respect to its mount. On the other hand, the case 19 for retrieving empty cartridges moves with the gun is elevation, but does not move therewith in tilt. Likewise, the case 19 is so organized that it may be readily emptied while the gun is in battery. Removal of the case 19 will only be necessary for servicing the gun. This is accomplished by first removing the gun from the ring 27 by extracting the bolts 29 and 30. Thereupon, the ring 27 may be turned through 90° so that the top opening in the ring lies opposite one of the segments 26, allowing ready removal of the ring from the yoke. Thereupon, the integral segments and journals 26 and 25 may be slipped inwardly from the bushings 22 to allow removal of the case 19 from between the arms 21 of the yoke 16.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In an aircraft gun installation comprising a forked yoke, a gun trunnioned for elevation and depression in said yoke and tiltable laterally therein on an axis substantially parallel to the line of fire, and a spent ammunition container embraced by said yoke, pivoted for elevation and depression with said gun.

2. In an aircraft gun installation comprising a yoke, a gun trunnioned for elevation and depression in said yoke and tiltable laterally therein, and a spent ammunition container embraced by said yoke, pivoted for elevation and depression with said gun, and constrained from tilting movement therewith.

3. In an aircraft gun installation, a yoke having a pair of upstanding spaced arms, a pair of trunnions each carried by one said arm at least one of said trunnions being adjustable along its axis, a segmental block carried by each said trunnion, and a machine gun having a transverse mounting ring, the ring being engaged on each side thereof by said blocks to permit lateral tilting of said gun relative to said yoke and to permit elevation and depression of said gun on said trunnions.

4. In an aircraft gun installation, a yoke having a pair of upstanding spaced arms, a pair of trunnions each carried by one said arm, a segmental block carried by each said trunnion, a machine gun having a transverse mounting ring, the ring being engaged on each side thereof by said blocks to permit lateral tilting of said gun relative to said yoke and to permit elevation and depression of said gun on said trunnions, and a spent ammunition container embraced by said yoke and pivoted on said trunnions for elevation and depression with said gun.

5. In an aircraft gun installation, a machine gun, an annularly grooved ring fixed to said gun, the axis of said ring being parallel with the line of fire, a pair of blocks having surfaces complementary to the grooved ring face and bearing on opposite portions of said ring, journals on said blocks the common axis thereof being normal to the ring axis, a yoke in which said journals are borne whereby said gun may be elevated or depressed by rotation of said journals in said yoke bearings, and at least one of said blocks and its associated journal being adjustably mounted in said yoke along said journal axis to adjust the bearing pressure between said blocks and ring.

6. In an aircraft gun installation, a support, a member pivoted thereto, a second member pivoted to said first member on a pivot axis substantially normal to and intersecting the first said member, said two members being movable with each other with respect to said support, a gun carried by said second member, one said pivot axis being substantially parallel to the gun's line of fire, and a container for spent ammunition movable with said gun about one said pivot axis and said gun being movable with respect to said container about the other said pivot axis.

7. In an aircraft gun installation including a support and a machine gun movable with respect thereto, an ammunition container detachably mounted on said gun and movable therewith, said container having an opening through which ammunition is fed to said gun, and a container for elements of spent ammunition detachably carried by said first container and detachable therewith from said gun, said spent ammunition container having an opening registering with an ammunition ejecting opening of said gun, through which said spent elements pass to said container.

8. In an aircraft gun installation an upstanding bifurcated yoke, a gun mounted between the bifurcations for lateral tilting on an axis parallel to the gun line of fire, said gun having a bottom opening through which elements of spent ammunition are ejected, and a container non-laterally-tiltably mounted between said bifurcations and having an upper opening through which said spent ammunition may pass to said container in any said tilting position to which said gun may be moved with respect to said yoke.

9. The combination with a gun, means for mounting said gun for movement about three mutually perpendicular axes, and a container associated with said gun to receive spent ammunition cases therefrom and to move therewith about two of said axes but not about the third axis, said container being secured to said mounting means.

10. An aircraft gun installation, comprising a forked yoke, a gun trunnioned for elevation and depression in said yoke and tiltable laterally therein about an axis substantially parallel to the line of fire, and a spent ammunition case container embraced by said yoke, pivoted for elevation and depression with said gun.

11. An aircraft gun installation, comprising a forked yoke, a gun trunnioned for elevation and depression in said yoke and tiltable laterally therein about an axis substantially parallel to the line of fire, a spent ammunition case container embraced by said yoke, pivoted for elevation and depression with said gun, and means for removing spent ammunition cases therefrom.

12. An aircraft gun installation, comprising a forked yoke, a gun trunnioned for elevation and depression in said yoke and tiltable laterally therein about an axis substantially parallel to the line of fire, a spent ammunition case container embraced by said yoke, pivoted for elevation and depression with said gun, means for removing spent ammunition cases therefrom, a spring closed door through which to remove spent cases from said container, and latch means to hold said door closed.

13. The combination with a gun, means for mounting said gun so as to have freedom of movement about three mutually perpendicular axes, and means movable with said gun about two axes only but adapted to receive spent ammunition cases from said gun regardless of movement of the gun about any or all of said axes, said last named means being secured to said mounting means.

CLEM G. TRIMBACH.
GUY A. LUBURG.
CAMILLE R. LEMONIER.

REFERENCES CITED

The following references are of record in the file of this patent:

UNITED STATES PATENTS

| Number | Name | Date |
|---|---|---|
| 1,337,327 | Rockwell | Apr. 20, 1920 |
| 1,401,558 | Rockwell | Dec. 27, 1921 |
| 700,835 | Schouboe | May 27, 1902 |
| 1,086,590 | Frisell | Feb. 10, 1914 |
| 1,339,410 | Norman | May 11, 1920 |
| 1,488,746 | D'Eyncourt et al. | Apr. 1, 1924 |
| 374,597 | Gregg | Dec. 13, 1887 |
| 1,483,987 | Rockwell | Feb. 19, 1924 |

FOREIGN PATENTS

| Number | Country | Date |
|---|---|---|
| 494,725 | French | Sept. 17, 1919 |
| 150,980 | British | Dec. 16, 1920 |